Feb. 28, 1950  F. DEITSCH  2,498,753
DUCT OR THE LIKE
Filed March 22, 1947  3 Sheets-Sheet 2

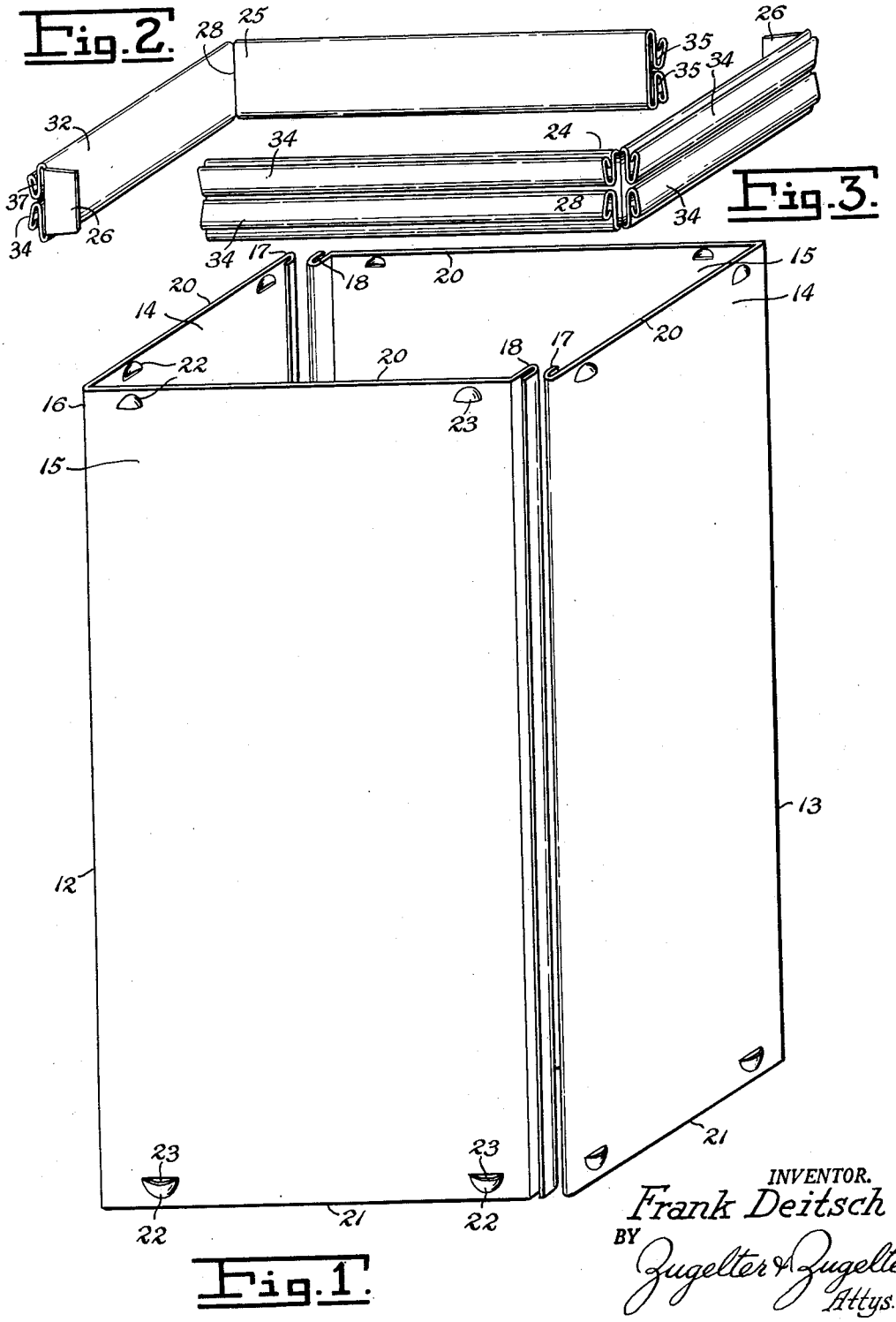

INVENTOR.
Frank Deitsch
BY Zugelter & Zugelter
Attys.

Feb. 28, 1950
F. DEITSCH
2,498,753
DUCT OR THE LIKE
Filed March 22, 1947
3 Sheets-Sheet 3
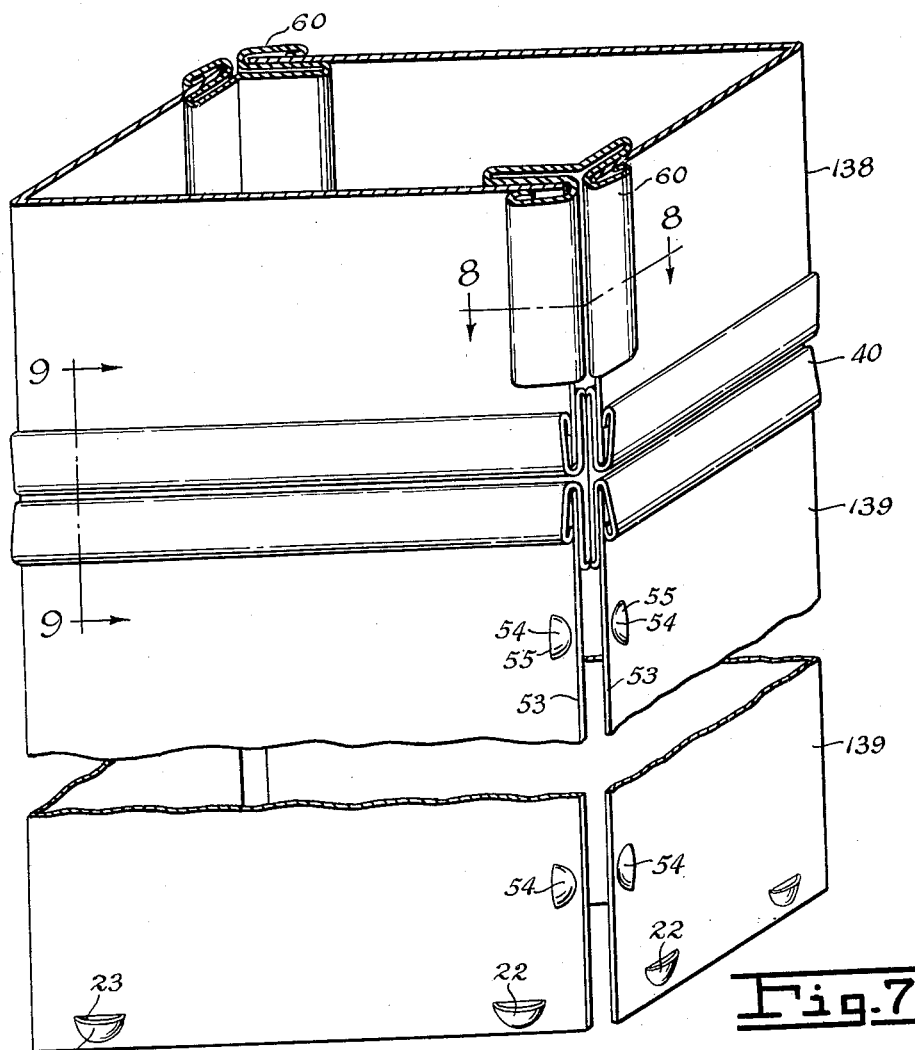
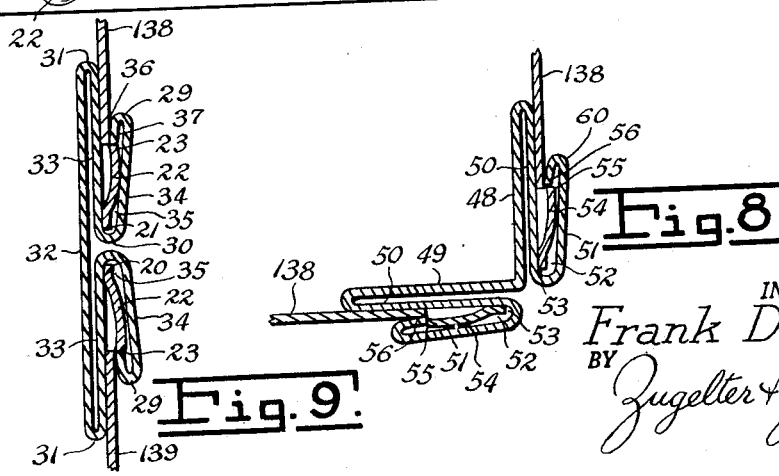
INVENTOR.
Frank Deitsch
BY
Zugelter & Zugelter
Attys.

Patented Feb. 28, 1950

2,498,753

UNITED STATES PATENT OFFICE 2,498,753

DUCT OR THE LIKE

Frank Deitsch, Fort Thomas, Ky.

Application March 22, 1947, Serial No. 736,518

3 Claims. (Cl. 285—201)

The present invention relates to improvements in the construction of ducts, conduits and the like suitable to convey a gas such as air from one location to another.

An object of the invention is to provide a sectional duct, the parts of which are easily shipped in a compact condition, and capable of being assembled on the job with a minimum expenditure of time and effort.

Another object is to provide a duct or conduit construction which is more durable and serviceable than those previously offered to the trade, the parts being so fitted and interlocked when assembled, as to furnish a substantially leakproof construction.

A further object of the invention is to provide a sectional duct construction wherein the duct sections may be snapped to connected relationship by means of a coupler frame having novel characteristics, the sections of the duct being initially fabricated at the factory but capable of being cut to length on the job when necessary.

Another object is to provide a duct section coupler with means whereby the entire duct may be stiffened or reinforced against collapse or deformation, the stiffening means being capable of use as a hanger, if desired.

A further object is to provide a duct or conduit construction which may be manufactured at low cost and with the use of ordinary bending and forming machinery.

The foregoing and other objects are attained by the means described herein and illustrated upon the accompanying drawings, in which:

Fig. 1 is a perspective view of a duct section made up of two identical parts to be crimped together along diagonally opposite corners.

Figs. 2 and 3 are perspective views of a pair of complementary coupler frame parts to be joined at diagonally opposite corners in providing a coupler for two of the sections illustrated by Fig. 1.

Fig. 7 is a perspective view partly shown in cross section, illustrating a modified form of duct section, of which two are shown in connected relationship.

Fig. 8 is an enlarged cross-sectional view taken on line 8—8 of Fig. 7.

Fig. 9 is an enlarged cross-sectional view taken on line 9—9 of Fig. 7.

Figure 4:
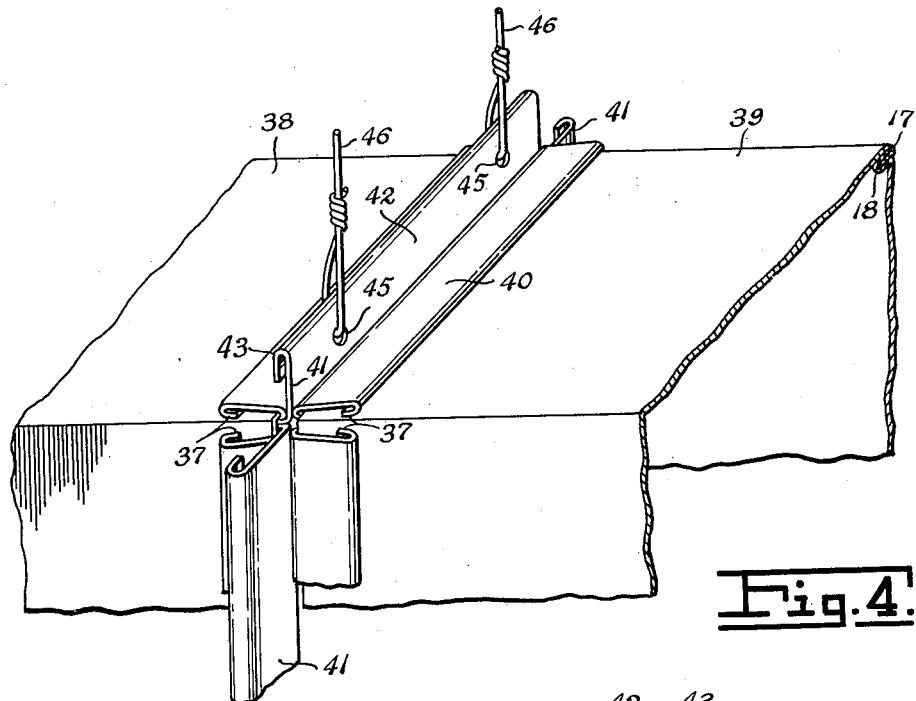
Fig. 4 is a fragmental perspective view of two duct sections joined together endwise by means of the coupler frame of the invention, having applied thereto the stiffeners previously mentioned, one of said stiffeners being indicated as a hanger for the assembled duct.

In the construction of ducts or conduits for conveying a gas such as air, it is essential to reduce as much as possible the time expended on the job, and such laborious work as may be performed most effectively in the fabricating plant. At the same time, however, quality of workmanship must not be sacrificed in the interest of speedy installation, and all joints and connections should be made at least as accurately as they could be produced by conventional methods heretofore employed. By means of the present invention, the production of joints and connections will surpass those made by means of the earlier methods, from the standpoint of accuracy and effectiveness of fitting, so that quality of workmanship is not made secondary to speed of installation of a duct system. The saving of time and effort made possible by means of the present invention accordingly is of great advantage to the contractor as well as to his client or employer.

In its simplified form as depicted by Fig. 1 of the accompanying drawings, the duct section comprises two identical parts 12 and 13, each consisting of metallic panels 14 and 15 arranged at approximate right angles to one another and formed from a single sheet bent along the fold line 16. The panels at their free edges may be furnished with any suitable type of connecting means such as the crimp hook 17 and the crimp socket 18 adapted to cooperate in forming a continuous tight joint along the length of the duct section at diagonally opposite corners thereof. When the crimped joint is formed, the duct section will take the form of an integral substantially rigid pipe or conduit which is approximately of rectangular cross-sectional shape. The diagonally opposed joints may be formed otherwise, as will be explained hereinafter.

The several panels of the assembled duct section are provided with coplanar upper edges 20 and similar lower edges 21 which establish the length of the duct section, and adjacent to said upper and lower edges are furnished locking means for joining any number of duct sections in axial alignment. The locking means of the panels may consist of keeper lugs pressed from the material of the panels, such lugs being indicated by the characters 22. Each lug preferably is of substantially crescent shape, and is inclined outwardly and away from the adjacent edge of a panel. Raw edge abutments 23 are provided on the lugs by reason of the pressing or punching operation utilized in forming the lugs, and these edges are all equally spaced from the adjacent panel edges 20. The nature of the locking lugs is best illustrated upon Figs. 7, 8 and 9 of the drawings.

Those locking lugs which are located at the lower end of the duct are disposed reversely to those at the upper end, so that the edge abutments 23 of such lugs face each other. It is desirable that the edge abutments 23 of the lugs adjacent to the lower edge 21 of the duct be spaced from said edge 21 at the same distance with which the edge abutments of the uppermost lugs are spaced from their adjacent duct edge 20, so that coupling of duct sections may be simplified and expedited. Thus, a completed duct section will correspond to the showing of Fig. 1 with the crimps completed at 17—18 on the diagonally opposite corners of the structure.

Figs. 2 and 3 represent parts to be joined at diagonally opposed corners for the purpose of producing a coupler frame, this frame being adapted to effectively join two adjacent assembled ducts in axial alignment. Reference is here made to Figs. 2, 3, 6, 7 and 9 for the details of construction of the coupler frame. As the coupler frame parts are identical, as shown upon Figs. 2 and 3, a description of one will suffice for the other also. Referring to Figs. 2 and 3, the coupler frame sections are indicated generally by the characters 24 and 25, and each consists of a blank initially formed in accordance with Fig. 6. This blank is substantially rectangular in plan, and has a tongue 26 extending from one end thereof. Intermediate the ends of the blank, the sheet is slit transversely at 27—27, with the inner ends of the slits spaced apart so that a line of fold 28 may be established between the slits in alignment therewith. Other lines of fold are indicated at 29, 30 and 31, these fold lines running lengthwise of the blank and being duplicated along the opposed longitudinal edges of the blank. When properly bent along the various fold lines, the blank will form a coupler frame part consisting of a base 32 which is substantially flat, carrying inner skirts 33 defined by the fold lines 31 and 30, and outer skirts 34 defined by the fold lines 30 and 29. Skirts 33 and 34 are substantially parallel to the base 32, and between them in each instance is formed a latch channel 35 having a mouth 36 to receive the marginal end of a duct section. Interiorly of the mouth in each instance, there is formed a retainer lip 37, which may be an integral fold over flange formed by a longitudinal side edge of the blank. This retainer lip 37 extends the full length of each coupler frame section, and is duplicated at opposite sides of the coupler frame so as to grip the edge abutments 23 of the keeper lugs 22 furnished adjacent the ends of two duct sections to be joined together by means of the coupler frame. Once the frame has been slipped over the end of the duct section to effect a snap engagement between the several keeper lugs and the retainer lips within the mouth of the latch channel, the coupler frame will be securely locked to the duct section as illustrated by Fig. 9. It will also be noted that the duct ends 20 and 21 reach the bases of their respective latch channels at the fold 30, to provide a tight and substantially leakproof joint at those locations. It will be understood from the foregoing that two completed duct sections brought into endwise connection with the latch channels of the coupler frame, will be securely latched against longitudinal relative movement in all directions, thereby establishing a very rigid and durable composite duct.

It is to be understood that the coupler frame sections of Figs. 2 and 3 will be joined together by inserting the tongues 36 between the base and the skirts 33 of the sections in advance of applying the coupler frame to the end of any duct section. Thus, a complete coupler frame will be understood to correspond substantially in size and shape, with the cross-sectional shape of a duct section to which a connection is desired. That is to say, the coupler frame sections of Figs. 2 and 3 will be joined at their diagonally opposite corners to form an open frame, in advance of applying the coupler frame to a pair of duct sections to be axially joined.

Figure 5:
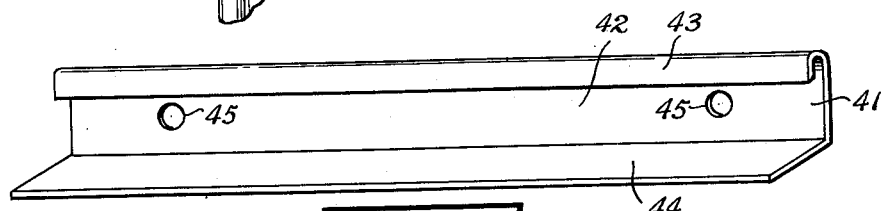
Fig. 5 is a perspective view of a stiffener element as shown in Fig. 4.
Figure 6:
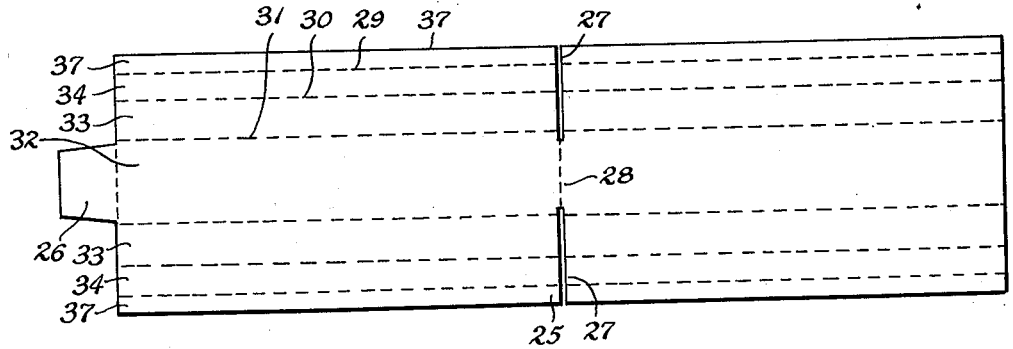
Fig. 6 is a plan view of one of the coupler frame elements illustrated by Figs. 2 and 3, before the blank is formed up.

With reference now to Fig. 4, there is shown a pair of axially aligned duct sections 38 and 39 connected together endwise by means of a coupler frame 40, these parts all corresponding to the parts previously described. It will be understood that the coupler frame 40 extends completely around both duct sections, with the retainer lips 37 thereof engaging the edge abutments of the keeper lugs of both duct sections to hold the sections securely in connected relationship as previously explained. In Fig. 4, however, there is shown applied to the coupler frame a stiffener 41 shown in detail upon Fig. 5, this stiffener being in the form of an angle strip having a leg 42 reinforced by means of a beaded or folded edge 43, the opposite leg 44 being disposed at right angles to the leg 42. Leg 44 is adapted for insertion into the space between the base and the inner skirt of the coupler frame, so that the reinforced leg 42 will extend substantially at right angles to the axis of the ducts. Stiffening elements such as 41 may be applied to one or more sides of the coupler frame for reinforcement purposes. In Fig. 4 three reinforcing stiffener elements are shown along three sides of the ducts, it being understood that the fourth side might likewise be reinforced in this manner. If desired, one or more of the stiffener elements might be furnished with suspension means for the composite duct, such means being shown by way of example as a plurality of perforations 45 for the reception of suspension wires or cords 46. Instead of wire or cords, metallic strips or angles might be attached to the supporting stiffener element for suspension purposes. The stiffener elements furnish a quickly applied and highly effective means of preventing collapse or distortion of the duct system at various locations, and serve also as a means of lending rigidity to the entire assembly. Wherever stiffening may be found unnecessary, the elements 41 readily may be omitted.

In the modified structure illustrated by Fig. 7, the coupling frame member 40 extending around the ducts 138 and 139 at their corresponding ends, is exactly as heretofore described, the holding function and purpose being identically the same as is illustrated by Figs. 1, 2, 3 and 9. Fig. 7 is distinguished from the previously described views, however, in substituting for the crimp connection 17—18 of Figs. 1 and 4 a form of connection simulating the snap connection of Fig. 9. As may readily be appreciated by referring to Fig. 8, the corner connection for the identical halves of the duct sections is the same as that illustrated by Fig. 9 except for the fact that the base 32 is bent longitudinally along a medial line to dispose opposite halves of the base area at right angles. Thus, the corner lock strip of Fig. 8 has base sections 48 and 49 formed at right angles so that the inner skirts 50 and the outer skirts 51 likewise are at right angles to those carried by the base sections 48 and 49 respectively. The skirts 50 and 51 each provide between them a latch channel 52 to receive a longitudinal edge margin 53 of a duct section, said edge margins being provided with inclined keeper lugs 54 having the same form as those indicated at 22 at the ends of the duct sections. By means of this construction, the corner strips indicated generally by the character 60 may be snapped onto the longitudinal edges of the identical sections which make up the ducts 138 and 139 to effect a connection equally as durable and substantial as the crimp connection illustrated at 17—18 upon Fig. 1. As will be understood, the edge abutments 55 of the inclined keeper lugs 54 are locked into the latch channels of the corner lock strip by means of the retainer lips 56 identically as was explained in keeping the connection between the coupler frame and the duct ends. This corner lock strip construction illustrated by Figs. 7 and 8 may be found highly desirable as a rapid connection means to be utilized on the job when crimping tools are not available for establishing the type of connection illustrated by Fig. 1. The structure of Figs. 7 and 8 can be assembled without the use of any tools, and is subject to application of the reinforcing element or stiffener illustrated by Figs. 4 and 5.

From the foregoing, it should be evident that the present invention provides for expeditious and inexpensive installation of duct systems regardless of length or capacity, and that a durable and workmanlike job will result from adoption of the means herein disclosed. While in practice the various duct sections will be of a standard or uniform length, they may be cut off to shorter lengths on the job, in which event the mechanic will form by hand, or with the aid of a simple hand operated punch, any new keeper lugs which may be required to replace such lugs as may be cut off in shortening the duct sections for fitting purposes. All parts of the structure may be fabricated to completion at the factory, where automatic machinery is available, thereby simplifying and expediting to a maximum extent the installation of any desired form of duct or conduit system.

The means of this invention is subject to various modifications and changes in structural details, and such are to be included as part of the invention except where limited by the appended claims.

What is claimed is:

1. In a device of the class described, the combination of a tubular duct section having opposite ends, at least one of which ends includes a series of keeper lugs, a coupler frame of approximately the same cross-sectional shape as the duct section, means duplicated and reversed upon the coupler frame for accommodating and gripping the keeper lugs of two axially aligned duct sections, stiffener means detachably attached to the coupler frame transversely of the duct section, said stiffener means having a pair of legs, one of said legs being disposed within the coupler frame for stiffening the frame, the other of said legs extending outwardly from the duct sections, and means on the outwardly extending leg for supporting the duct sections.

2. As a new article of manufacture, a duct which comprises a pair of hollow adjoining duct sections, each of said duct sections having a substantially flat upper surface, keeper lugs at adjacent ends of said duct sections, a coupler frame for said duct sections, said coupler frame having substantially the same cross-sectional shape as the duct sections, said coupler frame comprising a substantially flat base, inner skirts along opposite edges of the base and turned inwardly toward one another in substantial parallelism with the base, outer skirts extending reversely from the inner skirts in substantial parallelism therewith but spaced therefrom to provide elongated channels each having a mouth accessible from opposite directions, and a retainer lip turned inwardly within each mouth to engage and hold the keeper lugs of the duct section ends as said ends are introduced into the channel mouths from opposite directions, at least one of said inner skirts being spaced from the base to form a slot between the skirt and the base, opposite inner and outer skirts being spaced to form an outwardly directed opening between opposite skirts, a stiffener and supporting means having a pair of angularly disposed legs, one of said legs being positioned in the slot, the other leg extending outwardly from the duct sections, and means on the outwardly extending leg for supporting the duct sections.

3. As a new article of manufacture, a duct which comprises a pair of hollow adjoining duct sections, keeper lugs at adjacent ends of said duct sections, a coupler frame for said duct sections, said coupler frame having substantially the same cross sectional shape as the duct sections, said coupler frame comprising a substantially flat base, inner skirts along opposite edges of the base and turned inwardly toward one another in substantial parallelism with the base, outer skirts extending reversely from the inner skirts in substantial parallelism but spaced therefrom to provide elongated channels each having a mouth, and a return lip turned inwardly within each mouth to engage and hold the keeper lugs of the duct section ends as said ends are introduced into the chanel mouths. the mouths of the channels being accessible from opposite directions, the duct section ends being disposed in the channel mouths with the retainer lips engaging the lugs, whereby the coupler frame maintains the duct sections in assembled relationship, at least one of said skirts being spaced from the base to form a slot between the skirt and the base, opposite inner and outer skirts being spaced to form an outwardly directed opening between opposite skirts, a stiffening and supporting member having a pair of angularly disposed legs, one of said legs being disposed in the slot between the inner skirt of one channel and the base, the skirts of the other channel bearing on the second leg of said stiffener and supporting member to hold the first leg in the slot, said second leg extending outwardly from the duct sections, and means on the second leg for supporting the duct sections.

FRANK DEITSCH.

REFERENCES CITED

The following references are of record in the file of this patent:

UNITED STATES PATENTS

| Number | Name | Date |
| --- | --- | --- |
| 526,663 | Abrahams | Sept. 25, 1894 |
| 1,791,255 | Wagner | Feb. 3, 1931 |
| 2,126,499 | Petersen | Aug. 9, 1938 |
| 2,260,221 | Gray | Oct. 21, 1941 |
| 2,330,769 | Wichner | Sept. 28, 1943 |